United States Patent
Quinn et al.

(10) Patent No.: US 8,356,628 B2
(45) Date of Patent: Jan. 22, 2013

(54) ELECTRONIC BYPASS SYSTEM FOR A FLUID TREATMENT SYSTEM

(75) Inventors: Kerry Quinn, Palatine, IL (US); Allan Connolly, Chicago, IL (US)

(73) Assignee: Culligan International Company, Rosemont, IL (US)

( * ) Notice: Subject to any disclaimer, the term of this patent is extended or adjusted under 35 U.S.C. 154(b) by 804 days.

(21) Appl. No.: 12/242,490

(22) Filed: Sep. 30, 2008

(65) Prior Publication Data

US 2009/0084451 A1  Apr. 2, 2009

Related U.S. Application Data

(60) Provisional application No. 60/997,353, filed on Oct. 2, 2007.

(51) Int. Cl.
- F16C 1/00 (2006.01)
- F16C 3/00 (2006.01)
- F16K 11/00 (2006.01)
- F17D 1/00 (2006.01)
- C02F 1/00 (2006.01)
- C02F 1/42 (2006.01)
- C02F 5/00 (2006.01)

(52) U.S. Cl. .............. 137/599.11; 137/599.15

(58) Field of Classification Search ............ 251/249.5, 251/248, 251; 137/599.11, 599.15, 624.19, 137/597, 253–254

See application file for complete search history.

(56) References Cited

U.S. PATENT DOCUMENTS

| | | | | |
|---|---|---|---|---|
| 2,542,391 | A | * | 2/1951 | Brown ................. 137/625.29 |
| 3,675,775 | A | | 7/1972 | Obidniak |
| 3,807,425 | A | | 4/1974 | Boirum et al. |
| 4,275,448 | A | | 6/1981 | Le Dall |
| 4,429,267 | A | * | 1/1984 | Veale ...................... 318/594 |
| 4,568,465 | A | | 2/1986 | Davis et al. |
| 4,801,375 | A | | 1/1989 | Padilla |
| 4,893,332 | A | | 1/1990 | Brown |
| 4,972,877 | A | | 11/1990 | Halemba et al. |
| 5,299,775 | A | | 4/1994 | Kolze |
| 5,687,091 | A | | 11/1997 | Maung et al. |
| 5,817,231 | A | | 10/1998 | Souza |
| 6,051,144 | A | | 4/2000 | Clack et al. |

(Continued)

FOREIGN PATENT DOCUMENTS

EP  0447350  9/1991

(Continued)

OTHER PUBLICATIONS

European Search Report dated May 6, 2011 for Application No. EP 08017208.

*Primary Examiner* — Dinh Q. Nguyen
*Assistant Examiner* — Chee-Chong Lee
(74) *Attorney, Agent, or Firm* — Greer, Burns & Crain, Ltd.

(57) ABSTRACT

An electronic bypass system for a water softener having a raw water inlet and a bypass outlet, having a valve assembly associated with the water softener including at least one piston and a controller in communication with the at least one piston. The at least one piston is configured for automatically controlling water flow in a conduit between the raw water inlet and the bypass outlet in response to a signal sent from the controller.

17 Claims, 6 Drawing Sheets

U.S. PATENT DOCUMENTS

| | | |
|---|---|---|
| 6,206,042 B1 * | 3/2001 | Channell et al. ........... 137/624.2 |
| 6,239,708 B1 | 5/2001 | Young |
| 6,357,477 B1 * | 3/2002 | Walcott et al. ........... 137/599.15 |
| 6,596,159 B1 * | 7/2003 | Maruyama et al. ........... 210/139 |
| 6,790,362 B2 | 9/2004 | FitzGerald et al. |
| 6,812,848 B2 | 11/2004 | Candela |
| 6,934,862 B2 | 8/2005 | Sharood et al. |
| 2001/0039465 A1 | 11/2001 | Schultz et al. |
| 2006/0011526 A1 * | 1/2006 | Baarman et al. ............... 210/143 |
| 2006/0060512 A1 | 3/2006 | Astle et al. |
| 2006/0213825 A1 | 9/2006 | Averbeck |
| 2006/0231146 A1 | 10/2006 | Lillback |
| 2007/0072467 A1 | 3/2007 | Lee et al. |
| 2007/0119758 A1 | 5/2007 | Duplessis et al. |
| 2007/0119759 A1 | 5/2007 | Duplessis et al. |
| 2007/0119768 A1 | 5/2007 | Duplessis et al. |
| 2007/0205145 A1 | 9/2007 | Carnell |
| 2007/0215546 A1 * | 9/2007 | Watkins et al. ............... 210/652 |

FOREIGN PATENT DOCUMENTS

| | | |
|---|---|---|
| WO | WO 03019059 | 3/2003 |
| WO | WO 2007059100 | 5/2007 |

* cited by examiner

ELECTRONIC BYPASS SYSTEM FOR A FLUID TREATMENT SYSTEM

PRIORITY CLAIM

This application claims priority to and the benefit of U.S. Provisional Application No. 60/997,353 filed on Oct. 2, 2007.

BACKGROUND OF THE INVENTION

The present invention relates generally to fluid treatment systems such as water treatment systems, including water softeners, and more particularly to an electronic bypass system for a water softening system. It is recognized that many aspects of the present invention can be applied to other types of fluid treatment systems, such as filtering or de-ionizing systems.

Water softeners are well known in the art and typically include a raw water source, a treatment tank containing an ion exchange resin, a brine tank containing a brine solution, and a control valve for directing fluids between the source, the tanks and a drain or other output.

Water softening occurs by running water through the ion exchange resin, which replaces the calcium and magnesium cations in the water with sodium cations. As the ion exchange process continues, the resin eventually loses its capacity to soften water and must be replenished with sodium cations. The process by which the calcium and magnesium ions are removed, the capacity of the ion exchange resin to soften water is restored, and the sodium ions are replenished is known as regeneration.

During regeneration, brine, a concentrated or saturated salt solution, is passed through the ion exchange resin and the cations in the resin are replaced with sodium ions. Regeneration is a multi-step process incorporating a number of cycles, specifically, backwash, brine draw, rinse and refill cycles.

However, water softener owners sometimes need to use unsoftened or raw water for tasks such as washing cars or watering lawns, for example. To obtain raw water from current water softening systems, the user must go to the water softener and manually turn a bypass valve, which reconfigures the control valves so all incoming raw water is immediately redirected to a bypass outlet without being softened in the treatment tank.

One problem with conventional manual systems is that the user must physically go to the water softener to switch the softener from softening mode to bypass mode, which can be inconvenient. Further, to switch the softener to bypass mode, the user must manually turn a valve located on the water softener controller, which typically requires a significant amount of muscle/force to turn. If the user does not turn the valve properly, the flow path to the treatment tank may not be completely closed, reducing the flow rate of water out of the bypass outlet, and permitting some of the raw water to enter the treatment tank.

Additional problems can arise when the user has completed his intended use of bypassed water. Currently, the user must return to the water softener and manually turn the bypass valve back to the service position, inconveniently adding another step to the process. Also, if the user forgets to turn the bypass valve to the service position, the unit will remain in a bypassed configuration and the water supplied by the unit will continue to be raw or untreated.

Also, because of cost reasons, consumers often rent water softener systems. When a renter is behind on their monthly payments, the service provider/technician must gain access to the renter's home to permanently place the softener in bypass mode until payment is received. Such travel is time-consuming, an inconvenience to the service provider, and creates awkward situations at the renter's residence.

BRIEF SUMMARY

The present electronic bypass system for a water softener allows the user to automatically switch the softener from softening mode to bypass mode from either the controller on the softener or from a remote location in the user's home. The present system also enables a service provider to control a renter's water softener from a remote location.

Specifically, the present electronic bypass system includes a valve assembly associated with a water softener having a raw water inlet and a bypass outlet, including at least one piston and a controller in communication with the at least one piston. The at least one piston is configured for automatically controlling water flow in a conduit between the raw water inlet and the bypass outlet in response to a signal sent from said controller.

In another embodiment, the present electronic bypass system includes a valve assembly including a plurality of pistons, a gearbox including a plurality of cams, each of the cams including at least one peak and at least one valley that contact a corresponding piston of the plurality of pistons and at least one of the pistons configured for automatically opening the conduit between the raw water inlet and the bypass outlet when the piston is at the at least one valley, and closing the conduit when the piston is at the at least one peak. A controller is in communication with at least one of the pistons and is configured for controlling the automatic opening and closing of the conduit.

In another embodiment, the present electronic bypass system includes a plurality of pistons, a plurality of cams, each of the cams contacting a corresponding one of the pistons and including at least one peak and at least one valley, a position feedback gear matingly engaged with one of the cams and configured to indicate a cycle of the water softener and a gear sensor positioned adjacent to the position feedback gear and configured to generate a signal based on a position of the position feedback gear where at least one of the pistons is configured for automatically opening a conduit between the raw water inlet and the bypass outlet when the piston is at a valley, and closing the conduit when the piston is at a peak. A controller is in communication with at least one of the pistons and is configured for controlling the automatic opening and closing of the conduit based on the signal generated by the gear sensor.

DETAILED DESCRIPTION

Figure 1:
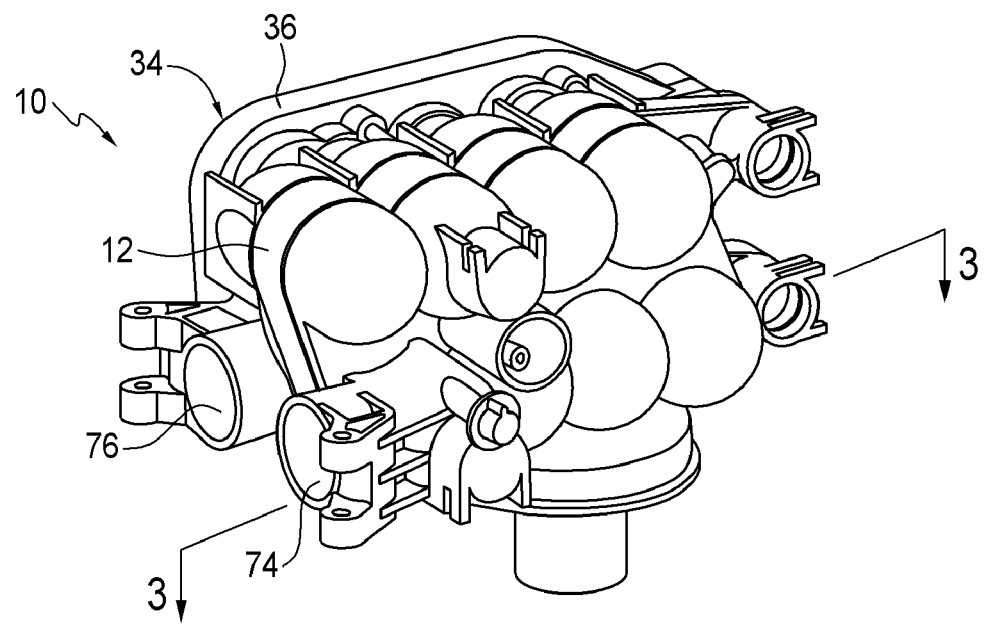
FIG. 1 is a perspective view of a valve assembly in accordance with the present electronic bypass system.
Figure 2:
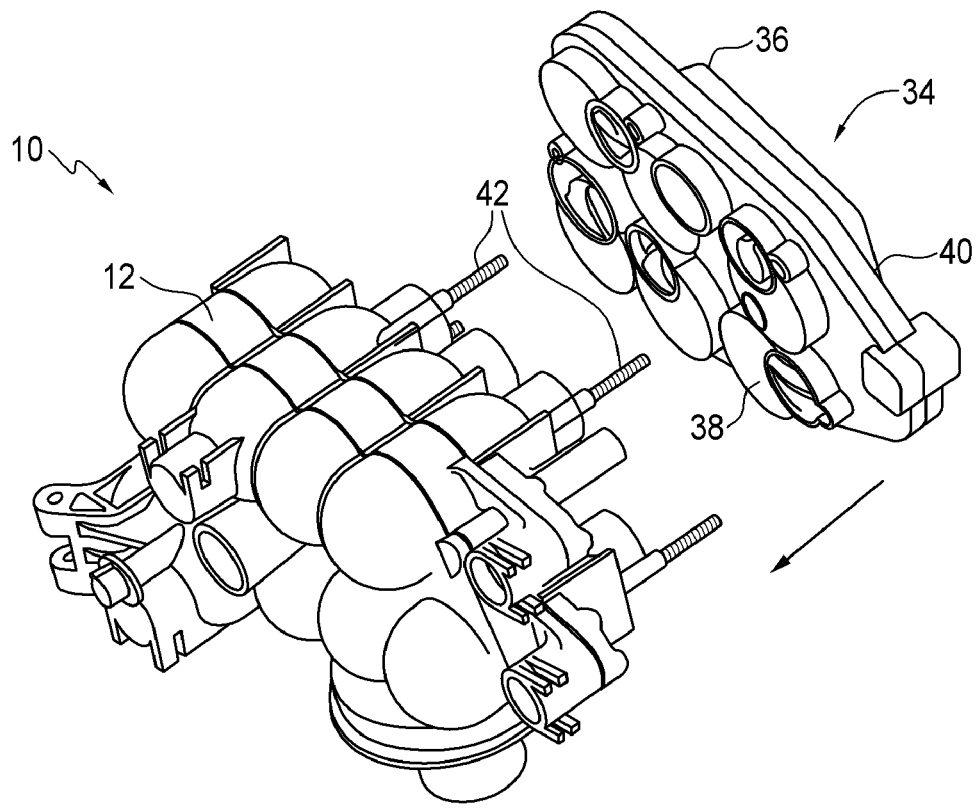
FIG. 2 is an exploded perspective view of the assembly in FIG. 1.

Referring now to FIGS. 1-3 and 5, a valve assembly for a water softening system is provided and generally designated 10. The valve assembly 10 includes a valve housing 12 defining at least one and preferably a plurality of open-ended compartments 14 each configured for including a reciprocating piston assembly 16.

Each of the piston assemblies 16 includes a piston 18 constructed and arranged for sliding within a corresponding one of the compartments 14.

Specifically, six pistons 18A-18F (FIG. 5) are provided in the present assembly 10, each independently operating to control flow to/from the inlets/outlets of the water softening system (not shown). For the purposes of electronic bypass of the water softener, only the piston 18A will be described in full detail. The remaining pistons 18B-18F and additional aspects of the valve assembly 10 are more fully described in commonly owned and U.S. Application Ser. No. 60/997,317, entitled CONTROL VALVE FOR A FLUID TREATMENT SYSTEM, filed Oct. 2, 2007 and herein incorporated by reference.

Figure 3:
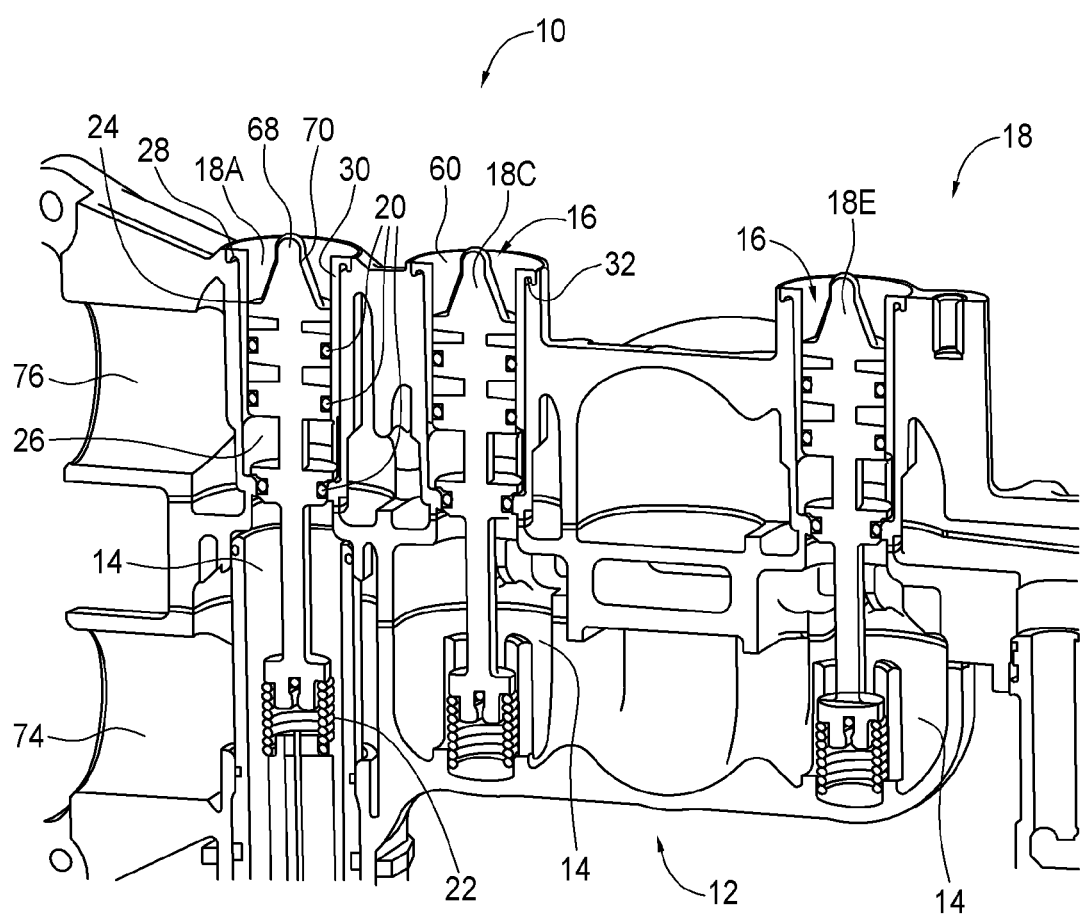
FIG. 3 is a partial cross-section view of the assembly taken along the line 3-3 in FIG. 1 and in the direction generally indicated.

The piston 18A includes at least one and preferably three sealing members 20 configured for providing a seal between the piston and the compartment 14 during movement of the piston, and a spring 22 configured for biasing the piston towards an open end of the compartment 14 as seen in FIG. 3. Preferably, the sealing members 20 are circular-shaped O-rings, as known in the art, although it is recognized that other sealing members may be employed.

To enhance sliding of the piston 18A within the compartment 14, a sleeve 24 is provided surrounding an upper portion of an interior sidewall 26 of the compartment. Preferably, the sleeve 24 is cylindrically-shaped to complement the substantially cylindrical shape of the piston 18A, and is sized to facilitate sealed reciprocal movement while preventing lateral movement of the piston 18A within the compartment. To properly seal the sleeve 24 within the compartment 14, a lip 28 radially extends from an upper edge 30 of the sleeve and is configured for engaging a seat 32 defined in the interior sidewall 26.

Figure 4:
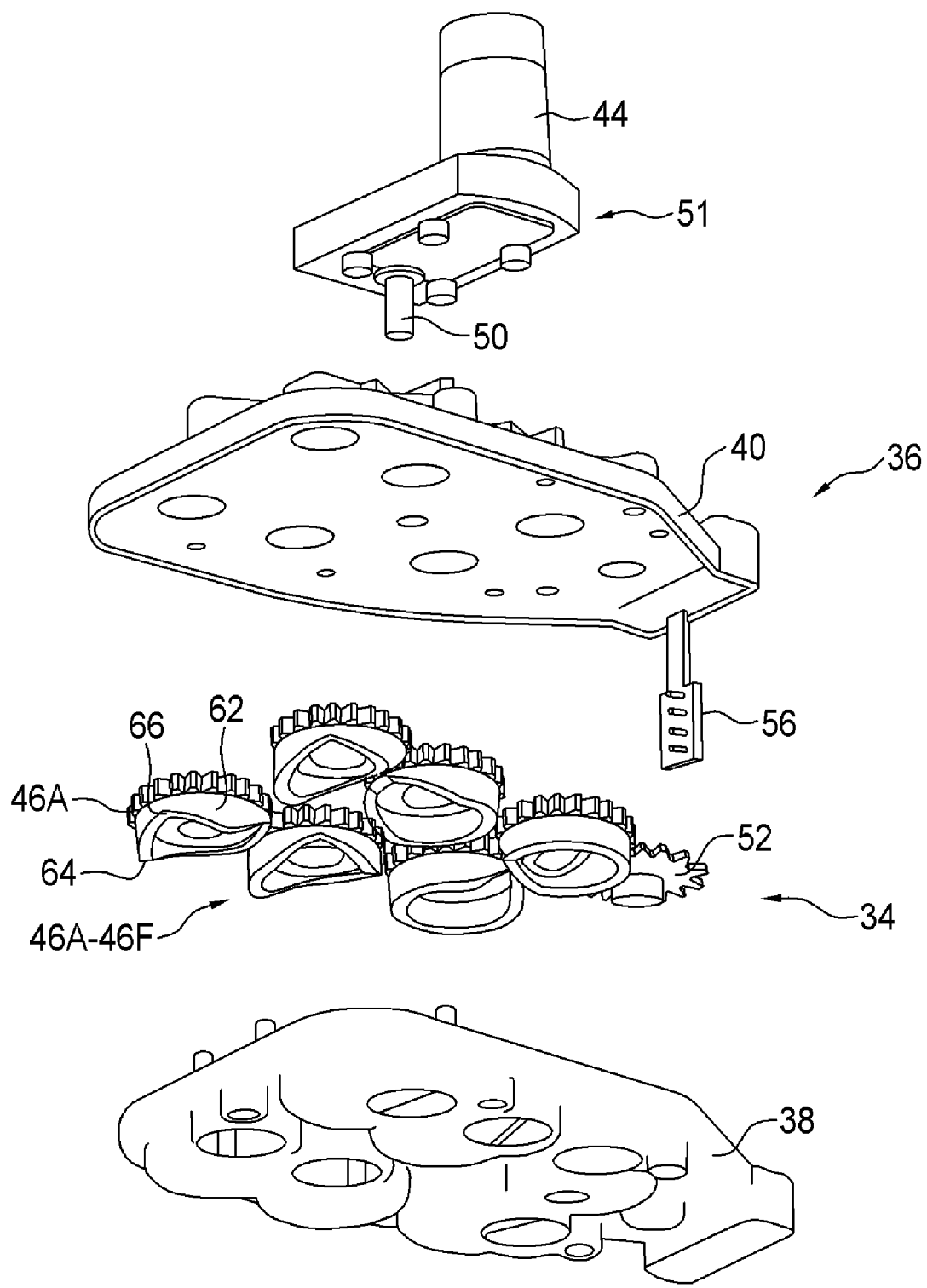
FIG. 4 is an exploded perspective view of the gearbox assembly in accordance with the present electronic bypass system.
Figure 4A:
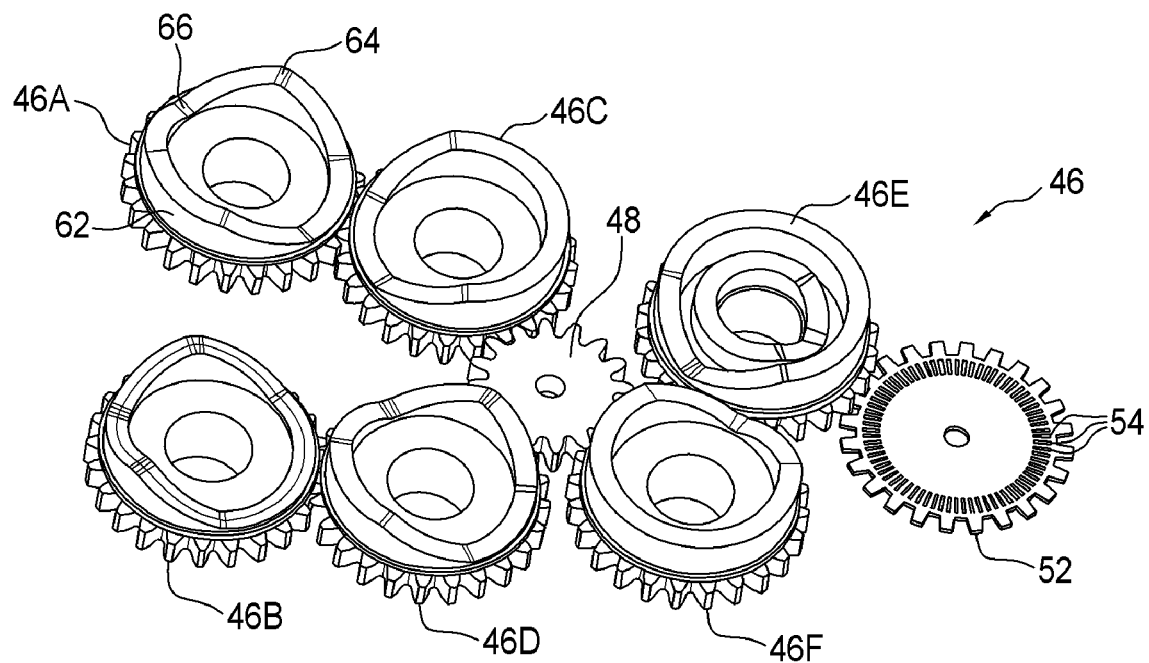
FIG. 4a is a perspective view of the cam assembly shown in FIG. 4.

Referring now to FIGS. 4 and 4a, the valve assembly 10 further includes a gearbox 34 having a gearbox housing 36 composed of a cover 38 and a base 40. The gearbox 34 is removably connected at the cover 38 to the valve housing 12 by a plurality of fasteners 42 or the like (FIG. 2), and is connected at the base 40 to a motor 44. As seen in FIGS. 3, 4 and 4a, the gearbox 34 houses a plurality of and preferably six cams 46A-46F, each cam corresponding to and configured for driving one of the pistons 18A-18F, which is described in further detail in commonly owned and U.S. Application Ser. No. 60/997,317, entitled CONTROL VALVE FOR A FLUID TREATMENT SYSTEM. Of particular significance to the electronic bypass system is the cam 46A, which drives the piston 18A and will be further described below.

The gearbox 34 further includes a motor drive gear 48 driven by a motor shaft 50 extending from the motor 44 either directly or through an internal motor gearbox 51 and constructed and arranged for driving the cams 46A-46F during water softener operation. A position feedback gear 52 is also provided in the gearbox 34 and is configured for notifying the user/service provider when the system is in the bypass stage. Specifically, the feedback gear 52 includes a plurality of and preferably seventy-two equally spaced slots 54, where every set of twelve slots corresponds to a separate cycle of the water softener (i.e., backwash, brine draw, rinse, etc.). One of the slots 54 is blocked and indicates the "home" or "service" position. The number and function assignment of the slots 54 may vary to suit the situation.

Figure 6:
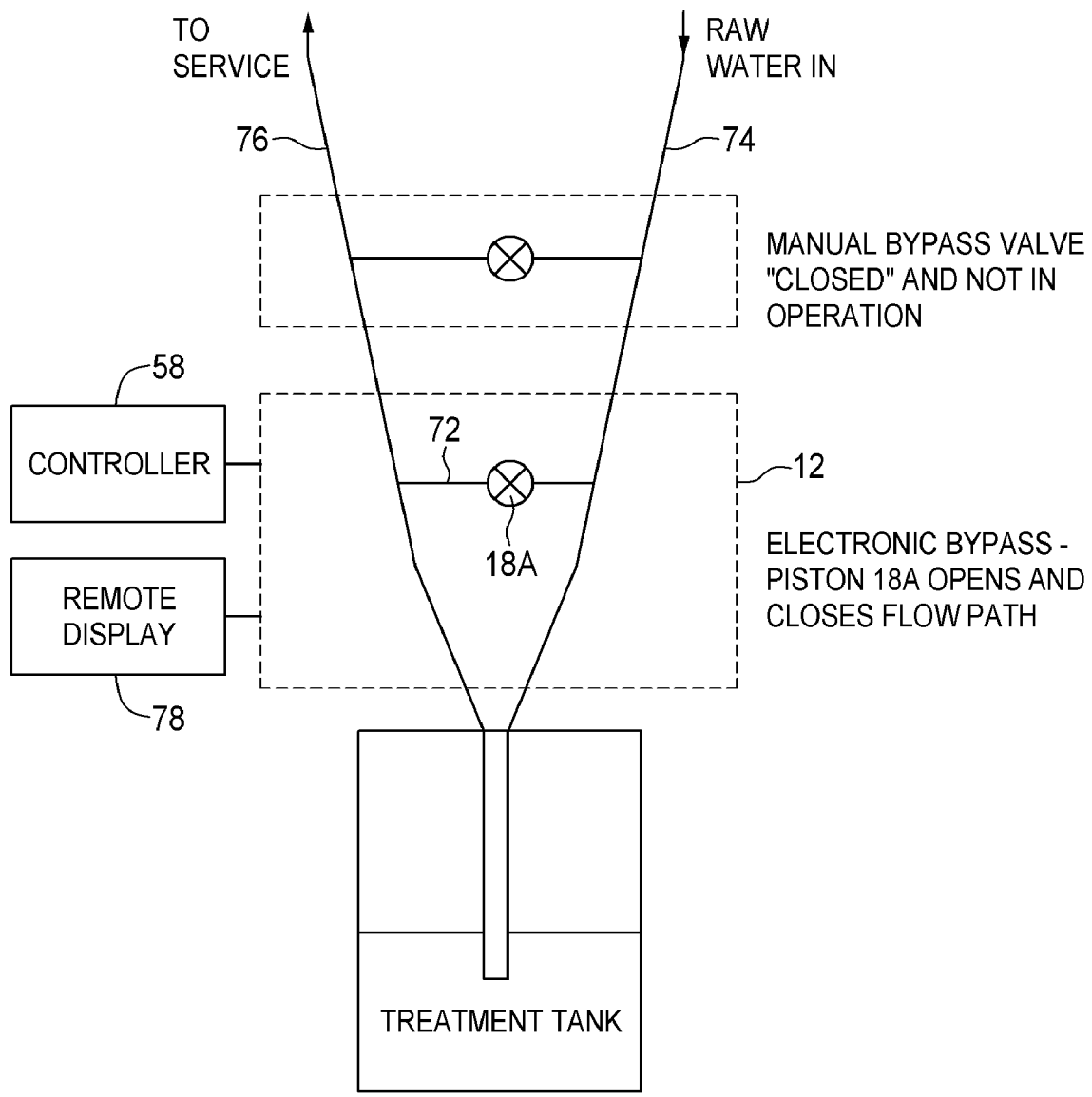
FIG. 6 is a schematic diagram showing the present electronic bypass system.

A gear sensor 56 is provided within the gearbox 34 adjacent to the feedback gear 52, and is configured for sending signals to a controller 58 (FIG. 6) indicating the position of the cams 46A-46F. Specifically, the sensor 56 is preferably a thru-beam sensor that optically interacts with the slots 54, producing a series of light pulses detected by the sensor and sent to the controller 58. The sensor 56 counts the number of slots 54, and is programmed such that for every twelve slots, a new step in the water softener cycle is actuated. When the feedback gear 52 has rotated such that the blocked or "service" position is sensed by the sensor 56, the slot count is reset to zero, and a signal is sent to the controller 58 indicating that the water softener has cycled through all of the steps (i.e., service, backwash, brine draw, rinse, refill, and bypass). The specific function of the feedback gear 52 with respect to the present electronic bypass system will be described in further detail below.

The spring 22 is configured for biasing the piston 18A through an opening 60 defined by the sleeve 24, such that the piston engages the cam 46A. Specifically, the cam 46A includes a peripheral edge 62 defining a combination of peaks 64 and valleys 66 that are preferably equally spaced around the circumference of the peripheral edge at 60° increments, resulting in a total of six peaks/valleys on the cam. Each peak 64 or valley 66 represents a separate step of the water softening process-service, backwash, brine draw, rinse, fill and bypass. Further, each peak 64 or valley 66 corresponds to one of the sets of twelve slots 54 provided in the position feedback gear 52.

As the motor drive gear 48 drives the cams 46A-46F, the pistons 18A-18F are biased by a combination of water pressure and their corresponding spring 22, enabling vertical movement of the pistons within their respective compartments 14. For engaging a corresponding one of the peripheral edges 62 of the cams 46A-46F, each of the pistons 18A-18F includes a cam follower 68 extending from a top end 70 of the piston. Thus, through operation, the engagement of the cam follower 68 against the peripheral edges 62 will overcome the biasing force of the spring 22.

Figure 5:
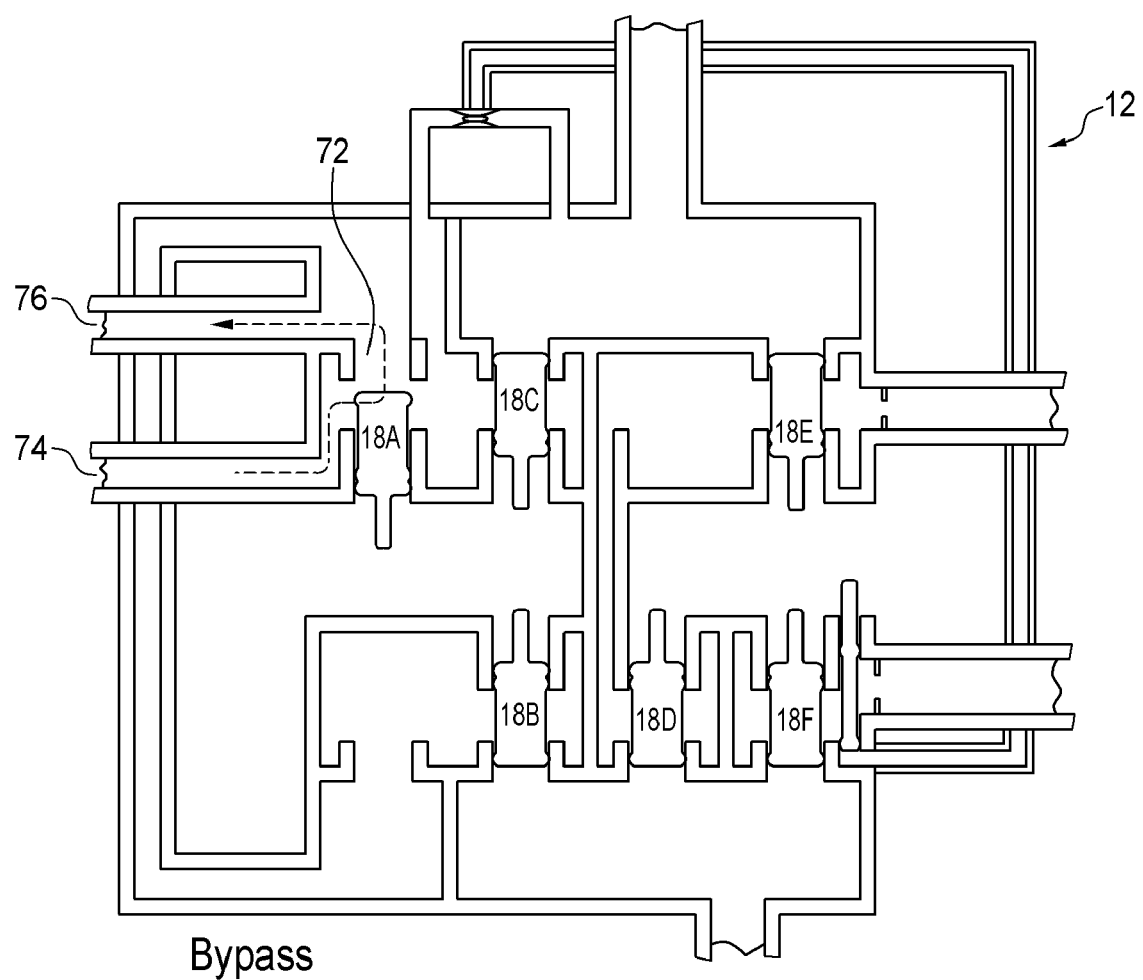
FIG. 5 is a schematic diagram showing the valve assembly of FIG. 1 in bypass mode.

With particular reference to the piston 18A, during operation, the cam follower 68 travels along the peaks 64 and valleys 66 of the peripheral edge 62 of the cam, enabling the piston 18A to open and close a water flow path or conduit 72 between a raw water inlet 74 and a bypass valve outlet 76 of the housing 12, as shown in FIG. 5. Specifically, as the cams 46A-46F are driven, cam follower 68 of piston 18A travels along the peripheral edge 62 of cam 46A. When the cam follower 68 is at the peak 64, the flow path 72 between the raw water inlet 74 and the bypass valve outlet 76 is closed. However, when the piston 18A travels along the peripheral edge 62 such that the cam follower 68 is at the cam valley 66, the piston reciprocates, opening the flow path 72 and allowing raw water to flow out of the bypass valve outlet 76 where it can be used by the consumer.

When the user wishes to switch the softener from softening mode to bypass mode, a button or similar control device (not shown) is actuated on the controller 58 (FIG. 6) attached to the softener. The controller 58 includes a main circuit board (not shown), as known in the art, which transmits a signal from the button to the motor 44 (which is connected to the controller by an electric cable or the like), activating the motor. The motor 44 drives the drive gear 48, rotating the cams 46A-46F, which in turn drives the pistons 18A-18F.

The position feedback gear 52 is also driven at this time, and as described above, as the feedback gear moves, the gear sensor 56 emits a beam through the slots 54, producing a series of light pulses that are sent to the controller 58. These light pulses are constantly sent during operation of the water softener, and the controller 58 counts the number of light pulses until the slots 54 corresponding to the bypass cycle are reached. The controller 58 runs the motor 44 until the feedback gear 52 has moved past the twelve slots 54 corresponding to bypass. For instance, in the current water softener system, the bypass cycle begins when the feedback gear 52 is at slot twelve (i.e., twelve slots away from the zero or "blocked" slot). However, it is appreciated that other methods for properly positioning the motor 44 and cams 46A-46F for bypass may be suitable, such as a magnetic disk/pick assembly, or a mechanical switch.

Accordingly, when the button is pressed, the controller 58 counts the number of light pulses or slots 54 the feedback gear 52 must move until it reaches the bypass step, and drives the motor 44 until this position is reached. When slot twelve is reached on the feedback gear 52 and the bypass cycle has begun, the cam follower 68 of piston 18A is traveling in the valley 66 of the cam 46A, opening the flow path 72 and allowing water to flow from the raw water inlet 74 to the bypass valve outlet 76 for use by the consumer, as described above.

The piston 18A can also be operated on a remotely located control display or remote display 78 (FIG. 6) in the user's residence or on a service provider's handheld device when the provider is outside of the user's residence. When the bypass function is actuated by the user, a signal is transmitted wirelessly or over a hardwired network to the circuit board on the controller 58 indicating that bypass has been selected. If the signal came from the wireless remote, then the controller 58 sends a signal back to the remote display 78 confirming receipt of the signal. If the remote display 78 does not receive confirmation from the controller 58 after a predetermined period of time, such as ten seconds, for example, the remote display resends the bypass signal to the controller 58. Once confirmation has been sent to the remote display 78, the controller 58 signals the motor 44 to start operating, repeating the steps identified above.

Such remote control of the softener is useful for service providers dealing with delinquent renters of water softener systems. Typically, the provider must access the renter's premises and directly shut off the water softener. However, with the remote control provided in the present system, the provider can permanently place the renter's softener in bypass mode from the remote location by actuating the bypass function from a handheld wireless device.

It is also contemplated that the controller 58 and remote display 78 are equipped with a timer function, enabling the consumer to select the number of minutes they want the system to remain in the bypass mode before it automatically switches back to normal softening mode.

Accordingly, using the current valve assembly 10, the water softener can electronically be switched from softening mode to bypass mode without the need to manually turn a valve, which requires a significant amount of force, or even be in the same location as the water softener. Such an electronic bypass system is less time consuming and easier to operate than current manual systems. The present electronic bypass system is also more efficient than current manual systems, because the piston 18A is either in the open or closed position, providing either no flow or an improved flow rate. In current systems, if the manual valve is not turned all the way, water can still flow to the treatment tank, and the flow rate of the water entering the bypass valve outlet is less than optimal.

While a particular embodiment of the present electronic bypass system has been described herein, it will be appreciated by those skilled in the art that changes and modifications may be made thereto without departing from the invention in its broader aspects.

What is claimed is:

1. An electronic bypass system for a water softener having a raw water inlet and a bypass outlet, comprising:
    a valve assembly associated with the water softener including at least one piston;
    a cam driving said piston;
    a position feedback gear matingly engaged with said cam and including a plurality of slots, wherein said slots are separated into sets, each of said sets including a designated number of said slots and corresponding to a cycle of the water softener, said position feedback gear being configured to indicate a cycle of the water softener based on said sets;
    a controller in communication with said at least one piston, said at least one piston configured for automatically controlling water flow in a conduit between the raw water inlet and the bypass outlet in response to a signal sent from said controller; and
    said cam includes at least one peak and at least one valley that contact said at least one piston, said at least one peak and at least one valley projecting along an axis that is parallel to an axis of reciprocation of said at least one piston.

2. The electronic bypass system of claim 1, wherein said conduit between the raw water inlet and the bypass outlet is automatically opened when said at least one piston contacts said at least one valley, and said conduit is automatically closed when said at least one piston is at said at least one peak.

3. The electronic bypass system of claim 1, further including a motor connected to a motor drive gear being configured to drive said cam.

4. The electronic bypass system of claim 1, wherein said controller includes a remote display.

5. The electronic bypass system of claim 1, wherein said controller includes a wireless remote display.

6. The electronic bypass system of claim 1, wherein said controller includes a timer for setting a time period for automatically controlling water flow in said conduit at designated times.

7. An electronic bypass system for a water softener having a raw water inlet and a bypass outlet, comprising:
    a valve assembly including a plurality of pistons;
    a gearbox including a plurality of cams, each of said cams including at least one peak and at least one valley that contact a corresponding piston of said plurality of pistons;
    at least one of said pistons configured for automatically opening said conduit between the raw water inlet and the bypass outlet when said piston is at said at least one valley, and closing said conduit when said piston is at said at least one peak;
    a position feedback gear positioned adjacent to and matingly engaged with at least one of said plurality of cams, said position feedback gear including a plurality of slots that are separated into sets, each of said sets including a designated number of said slots and corresponding to one of several operational cycles of the water softener, said cycles including service, backwash and rinse, said position feedback gear being configured to indicate a cycle of the water softener based on said sets; and a controller in communication with at least one of said pistons and configured for controlling a motor for activating said gearbox based on the position of said position feedback gear for moving said pistons from an operational cycle to a bypass condition which results in the automatic opening of said conduit; and said cam includes at least one peak and at least one valley that contact said at least one piston, said at least one peak and at least one valley projecting along an axis that is parallel to an axis of reciprocation of said at least one piston.

8. The electronic bypass system of claim 7, wherein said conduit between the raw water inlet and the bypass outlet is automatically opened when said at least one piston contacts the at least one valley, and said conduit is automatically closed when said at least one piston contacts the peak.

9. The electronic bypass system of claim 7, further including a motor and at least one motor drive gear connected to said motor and configured to drive at least one of said cams.

10. The electronic bypass system of claim 7, further including a gear sensor in communication with said position feedback gear and configured for sending a signal to said controller.

11. The electronic bypass system of claim 10, wherein said position feedback gear includes a plurality of equally-spaced slots, wherein a designated number of said slots each correspond to a different cycle of the water softener, and said gear sensor is constructed and arranged for monitoring said slots.

12. The electronic bypass system of claim 7, wherein said controller includes a remote display.

13. The electronic bypass system of claim 12, wherein said remote display is a handheld device.

14. The electronic bypass system of claim 12, further including a timer in communication with said remote display and configured for automatically controlling water flow in said conduit at designated times.

15. The electronic bypass system of claim 7, wherein said controller includes a wireless remote display.

16. The electronic bypass system of claim 7, which includes a timer in communication with said controller and configured for automatically controlling water flow in said conduit at designated times.

17. An electronic bypass system for a water softener having a raw water inlet and a bypass outlet, comprising:

a plurality of pistons;

a plurality of cams, each of said cams contacting a corresponding one of said pistons and including at least one peak and at least one valley;

a position feedback gear matingly engaged with one of said cams and including a plurality of equally spaced slots separated into sets, each of said sets representing different operational cycles of the water softener, said operational cycles including service, backwash and rinse;

a gear sensor positioned adjacent to said position feedback gear and configured to generate a signal based on a position of said position feedback gear relative to said gear sensor;

at least one of said pistons configured for automatically opening a conduit between the raw water inlet and the bypass outlet when said piston is at said at least one valley, and closing said conduit when said piston is at said at least one peak; and a controller in communication with at least one of said pistons and configured for controlling the softener by switching from an operational cycle to a bypass condition and automatic opening and closing of said conduit based on said signal generated by said gear sensor; and said cam includes at least one peak and at least one valley that contact said at least one piston, said at least one peak and at least one valley projecting along an axis that is parallel to an axis of reciprocation of said at least one piston.

* * * * *